United States Patent [19]

Strutynski

[11] 4,040,033

[45] Aug. 2, 1977

[54] MICROPROGRAMMABLE DATA PROCESSOR WITH A MICROPROGRAM BUFFER MEMORY

[75] Inventor: Waldemar Strutynski, Munich, Germany

[73] Assignee: Siemens Aktiengesellschaft, Berlin & Munich, Germany

[21] Appl. No.: 668,060

[22] Filed: Mar. 18, 1976

[30] Foreign Application Priority Data

Mar. 20, 1975 Germany .............................. 2512270

[51] Int. Cl.² .............................................. G06F 9/16
[52] U.S. Cl. .................................................. 364/200
[58] Field of Search ...................................... 340/172.5

*Primary Examiner*—James D. Thomas
*Attorney, Agent, or Firm*—Hill, Gross, Simpson, Van Santen, Steadman, Chiara & Simpson

[57] ABSTRACT

A control unit for a processor, which can be controlled by microprograms, in a data processing system utilizes a microprogram memory into which recordings can be made (writable control memory), which exibits an access time which is greater than the machine cycle. The apparatus has an address register which is connected to the selector inputs of the memory and a microcommand register which is connected to the information outputs of the microprogram memory. A decoder unit is connected to the register and serve to derive control signals for a processing unit of the processor from a microcommand in the microcommand register. A switching network is arranged between the microcommand register and the address register and serves to form the address of the following microcommand. The apparatus is particularly characterized in that the information outputs of the microprogram memory are connected to the inputs of the microcommand register, both directly and indirectly via a buffer memory which exhibits an access time which is considerably less than that of the microprogram memory. The memory cells which each store a microcommand can be selected by the low-value bit positions of an entry in the address register and the buffer memory is assigned a marker network in such a manner that with the aid of the low-value bit positions of the entry in the address register, an entry in a storage position of the buffer memory can be marked as valid.

3 Claims, 5 Drawing Figures

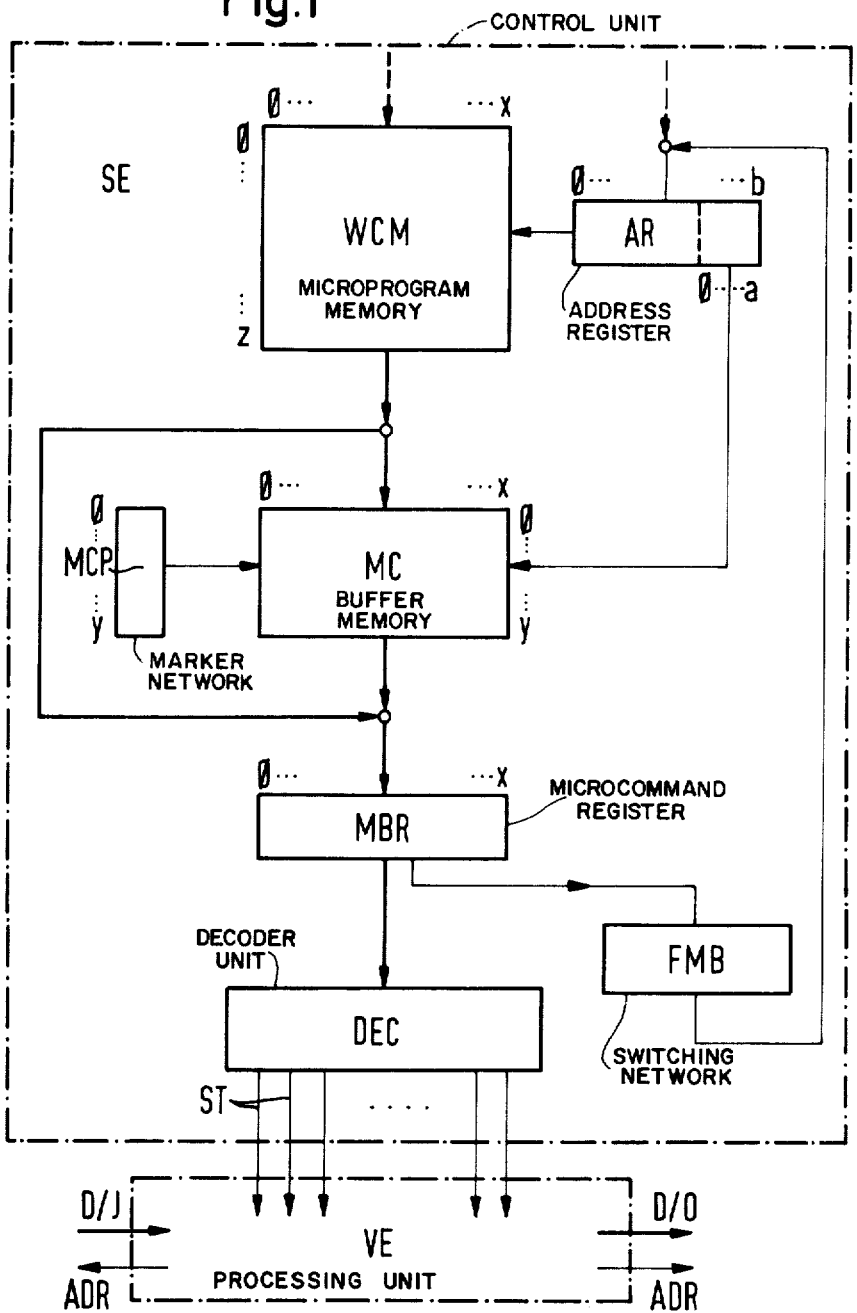

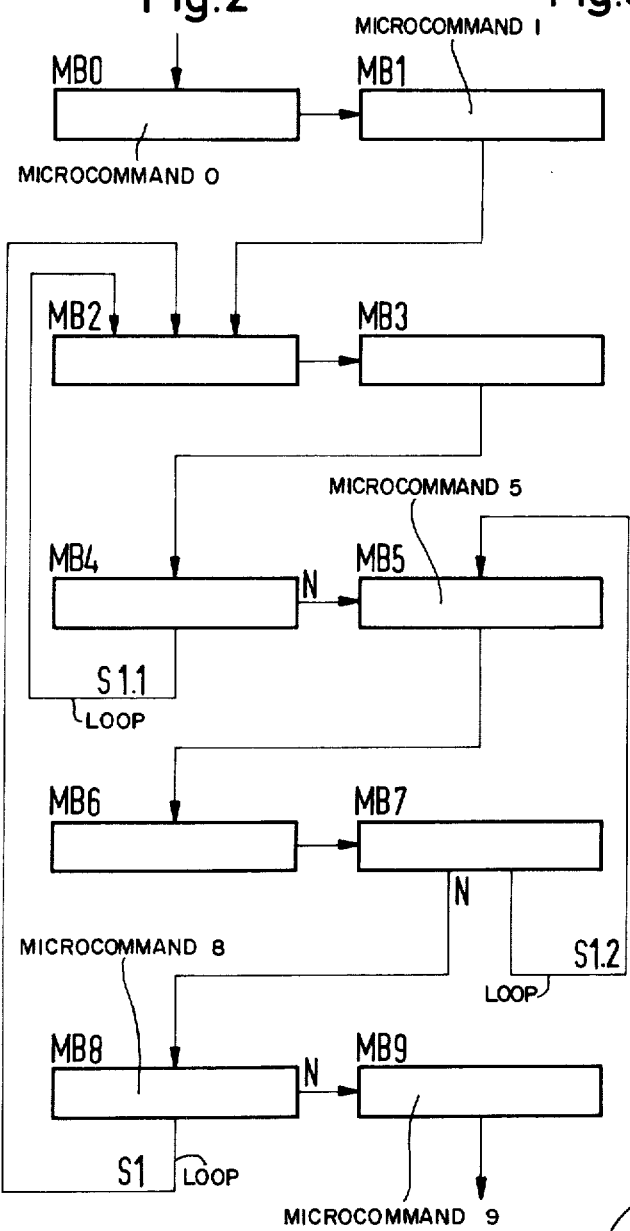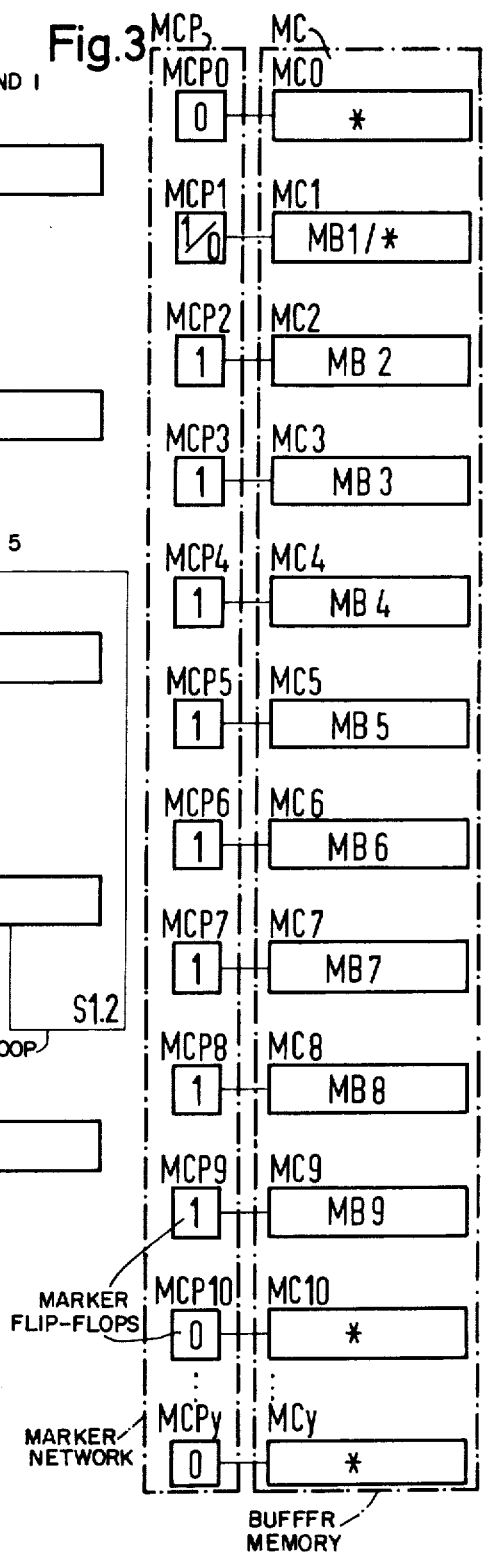

MICROPROGRAMMABLE DATA PROCESSOR WITH A MICROPROGRAM BUFFER MEMORY

BACKGROUND OF THE INVENTION

1. Field of the Invention

This invention relates to a control unit for a processor which can be controlled by microprograms, in a data processing system, having a microprogram memory in which recording can be made, exhibiting an access time which is longer than the machine cycle, having an address register which is connected to the selector inputs of the memory, having a microcommand register which is connected to the information outputs of the microprogram memory, having a decoder unit which is connected to the register and by means of which control signals for a processing unit of the processor can be derived from a microcommand in the microcommand register, and having a switching network which is arranged between the microcommand register and the address register and which serves to form the address of the following microcommand, and the present invention further relates to a process for the operation of such a control unit.

2. Description of the Prior Art

Because of a series of advantages, microprogramming has met with a growing interest as a control principle for digital calculating unit. The control signals for the microprogram-controlled processor are obtained from bit patterns which are combined in microcommand words and which are stored in read-only memories or writable control memories.

As explained by Husson in his book "Microprogramming: Principles and Practices," Prentice Hall 1970, at Chpt. 2.8, this microprogram memory forms an essential component of a microprogram control unit as it generally governs the expense of a microprogram control unit. Because of the number of microcommand words and the bits in the individual microcommand words, the microprogram memory is two-dimensional. The requisite number of microcommand words is dependent upon the size and the complexity of the selected machine commands, upon their format, upon the addressing mechanism, and upon the efficiency of the interrupt handling of the data processing system.

The length of each microcommand word is determined from the extent of the parallel operation possible within the system. The greater the number of parallel data channels, the more different control columns ae required to control the latter. The more complex the data channels are themselves, the greater is the number of control lines, and, in turn, the more extensive are the associated control columns. On the other hand, a more extensive microcommand word enables a larger number of functions to be handled in one machine cycle, thus reducing the number of microcommand words.

This, in itself, gives rise to an entire series of limiting conditions to one whose is skilled in the art, which conditions must be taken into consideration in the design of microprogrammable processors and which considerations are governed not only by costs. To be taken into account are not only differing microcommand structures for the direct or coded control of the processor, but also the time conditions governing the control sequence in the processor, in conjunction with the particular technology which is to be selected. These time conditions are based on the storage access time for a selected storage medium, which is dependent upon the particular technique, and the typical transit times of the circuitry techniques employed for the requisite switching networks and register sets. To achieve an efficient control, an investigation must consequently be carried out into the mutual relationship between the times required for the machine cycle, the microprogram memory cycle, the microcommand decoding and the determination of the address of the following microcommand. These relationships must then be taken into account in the selection of the microcommand format.

The overall time outlay for the processing of a microcommand is composed of the following four entities in the case of sequential processing:

Access to the microprogram memory and read-out off the addressed microcommand into a microcommand register;

Decoding of the contents of the microcommand register;

Logic linking of the register contents addressed by the microcommand in a processing unit, i.e. the actual machine cycle; and Formation of the address of the next microcommand.

If these individual processes run without any overlapping, after each machine cycle, the processing unit must wait until the mext microcommand has been read-out and decoded. In this extreme situation, the microcommand format should be designed to be such that a microcommand can control either one machine cycle which is long in relation to the access time or else more than one machine cycle. In practice, however, it is attempted to overlap the aforementioned processes a far as possible. This is, however, subject to limits, as microprograms must also allow data-dependent branchings which, however, impede the formation of the following address.

It is not necessary to enter into further details for it is to be clear that the time conditions of the microprogram memory influence the microcommand format. The aforementioned limitations draw the following general conclusion in this respect. If the memory cycle is longer than a possible machine cycle, the microcommand format must be extended. Then, it is either possible to process an additional quantity in one machine cycle in the processing unit, with an additional circuitry outlay, thus extending the machine cycle, or a microcommand can control more than one machine cycle. If, on the other hand, the memory cycle is considerably shorter than a given machine cycle, the format of the microcommand words should be reduced in order to shorten the machine cycle.

Generally speaking, it follows that the size of the microcommand word, and thus the extent of the processing in machine cycle, should be matched to the technology, i.e. to the speed of the microcommand memory, in such a manner that the microprogram memory and the processing unit can operate with approximately equal cycles and suitable overlap, without it being necessary for one of the two units to wait for the other.

In a practical example, this general principle results in a compromise of matching the structure of a microprogram-control processor to the time conditions of the storage medium being employed as a microprogram memory. It is doubtless, however, that one thereby loses the advantages of more efficient processors in consideration of "slower" technologies of the storage medium. In this case, the memory and the processor are coordinates with one another in such a way that there would appear to be little point in using the processor, even with higher speed storage medium which may be developed in the furture.

SUMMARY OF THE INVENTION

Therefore, the object of the present invention is to provide a control unit for a processor, which can be controlled by microprograms, and of the type described generally above, in such a manner that the properties of a modern processor which are based on structure and construction can be fully exploited in respect of its efficiency, i.e. that the selection of the storage medium for the microprogram memory in which recordings can be made still co-determines, although no longer crucially influences, the efficiency of the entire system.

This object is realized according to the present invention in that the information outputs of the microprogram memory are connected to the inputs of the microcommand register, both directly and indirectly by way of a buffer memory which has an access time which is considerably less than that of the microprogram memory, and the cells of which, each of which store a microcommand, can be selected by the low-value bit positions of the entry in the address register, and that the buffer memory is asigned a marker network is such a manner that when the aid of the low-value bit positions of the entry in the address register, an entry is a storage position of the buffer memory can be marked as valid. For the currently practical situation of a slow microprogram memory exhibiting an access time which is long in relation to a possible machine cycle, this has the following significance. In contrast to the above-mentioned general principle, the machine cycle time is not extended and thus the resultant consequences regarding the microcommand format and the circuitry outlay are avoided. The advantages of the simple structure of a processor featuring short machine cycle times are therefore retained. At a later data, a processor of this type can therefore also be operated together with further developed "faster" storage media in which case a higher efficiency will be achieved without any additional expense.

The use of a buffer memory for the microcommands results in a gain of efficiency which is based on the fact that microprograms, like programs of higher programming languages, contain program components which are run consecutively more than once. The individual microcommands of program loops of this type are entered into a high speed intermediate memory in parallel to their first execution, and then, the next time the loop is run through, no longer require reading out from the relatively slow microprogram memory.

Here, the small amount of hardware for the buffer memory and the operation thereof are of particular advantage. This expense is considerably less than that required when the machine cycle is increased by the extension of the microcommand format and, in association therewith, the hardward involved. Another advantage of this realization for the entire system is the likewise associated reduction in load on an interface which is common to the working memory and the microprogram memory, as then access is needed to the microprogram memory only during the first loop cycle.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of a microprogram-controlled processor designed in accordance with the present invention;

FIG. 2 is an exemplary embodiment of the control flow in the execution of a microprogram having a plurality of program loops which are partially internested into one another;

FIG. 3 is a block diagram illustrating the seizure of the buffer memory and the state of the marking network assigned to the buffer memory, in the execution of the microprogram represented in FIG. 2.

DESCRIPTION OF THE PREFERRED EMBODIMENTS

Figure 4:
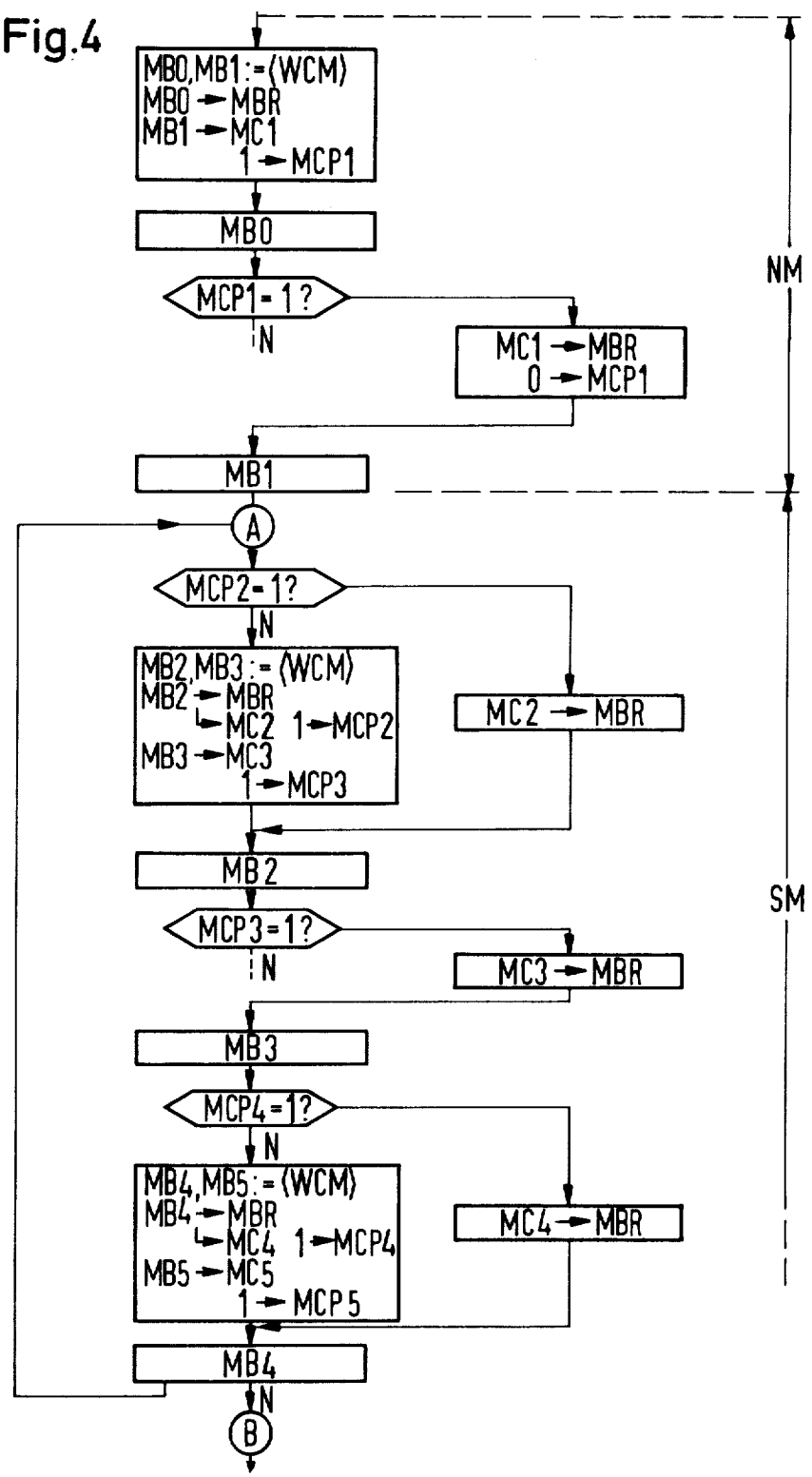
FIGS. 4 and 5, taken together, illustrate two interrelated parts of a flow chart in which the control sequence for the exemplary embodiment of the microprogram illustrated in FIG. 2, illustrated in greater detail.

The microprogram-controlled processor of a data processing system, illustrated in the block circuit diagram of FIG. 1, is seen as comprising a control unit SE and a processing unit VE. Because of the functional relationship, the control unit SE contains a microprogram memory WCM in which recordings can be made (writable control memory). This is a matrix memory which contains $z + 1$ microcommand words each comprising $x + 1$ bit positions which can be selected on the basis of the contents of an address register AR which is assigned to the microprogram memory WCM and which comprises $b + 1$ bit positions. The length of the latter can thus be obtained from the equation $$b = \ln (z + 1). \tag{1}$$

The information output of the microprogram memory WCM are, as indicated by solid line data channel, connected in parallel to the inputs of a microcommand register MBR which comprises $x + 1$ bit positions. The microcommand register MBR is connected to a decoder unit DEC which serves to convert the relevant information content of the microcommand register MBR into control signals which are conducted, via control signal lines ST, to the individual function units of the processing device VE.

In the processing unit VE, arrows indicate, purely schematically, data channels D/I and D/O which indicate the data flow for data which are to be processed and which have already been processed. Control lines which are required for this purpose and which serve to address data which has been requested and is to be emitted are referenced ADR. In order to form the address of the following microcommand in a microprogram, another switching network FMB is provided which is arranged between the microcommand register MBR and the address register AR. As far as it has been described above, the fundamental construction of the microprogram-controlled processor is known per se, so that it is unnecessary to discuss the same in further detail in the described structure of the control unit SE and, indeed far less, than of the processing unit VE.

The illustrated control unit SE contains, however, in addition to the aforementioned bit-parallel conection of the information outputs of the microprogram memory WCM to the microprogram register MBR, a further indirect data channel. The information outputs of the microprogram memory WCM are, in fact, also connected in parallel to buffer memory MC which is composed of a "high speed" register set. Because of its construction, this buffer memory possesses a considerably short access time than the microprogram memory WCM and also exhibits a scope of only $y + 1$ types of microcommands, each comprising $x + 1$ bit positions. The buffer memory MC is added by way of the lower-value $a + 1$ bit positions of the address register AR in accordance with the equation $$a = \ln(y + 1). \qquad (2)$$

The buffer memory MC is asigned a marker network MCP. For each storage position of a microcommand work in the buffer memory MC, the marker network MCP contains a noting flip-flop. These noting flip-flops MCPO-MCPY are set whenever the assigned storage position in the buffer memory MC is loaded. The set state of a noting flip-flop thus represents a validity characteristic for a specific entry in the buffer memory MC. The information outputs of the buffer memory MC are themselves connected in parallel to the information outputs of the microprogram memory WCM and to the inputs of the microcommand register MBR. Therefore, in the microcommand register MBR, microcommands can be obtained either directly from the microprogram memory WCM or from the buffer memory MC for decoding.

In explanation of the control sequence, i.e. the obtaining of the microcommands for decoding, reference is made to FIG. 2 which schematically represents an example of a microprogram in the form of a simplified flow chart. In FIG. 2 it has been assumed. for example, that the access width of the microprogram memory WCM corresponds, at the maximum, to twice the microcommand format. This is indicated in the flow chart by two microcommands MB (MB0, MB1) arranged next to one another.

The possible machine cycle will not be assumed to be a quarter of the access time to the microprogram memory WCM, so that, when two microcommands are used, two machine cycles of the processing unit can be controlled with one memory access. The ratio of memory access time to processing time thus amounts to 2:1, under the condition that the microcommands must in each case be read-out directly from the microprogram memory WCM. As will be illustrated, this ratio is decisively improved by the use of the buffer memory MC. In addition, the flow chart in FIG. 2 contains only those items of information which are required for a basic understanding of the diagram, i.e. it contains no indications as to which machine functions are being controlled.

If the illustrated data flow is followed, it becomes clear that this microprogram possesss three internested groups S1, S1.1 and S1.2. The superordinate loop S1 consists of seven microcommands MB2–MB8 contains the two other loops, the loop S1.1 comprising the microcommands MB2–MB4 and the loop S1.2 comprising the microcommands MB5–MB7. Two modes of operation, the normal move and the loop mode, will be distinguishes between for the control sequence.

In the normal mode, the buffer memory MC serves only to intermediately store the second microcommand which is read out in the event of an access to a microprogram memory WCM, as long as the first microcommand occupies the microcommand register MBR. On the other hand, the loop mode is initiated by the statement of a corresponding subsidiary function in the microcommand which is to be executed prior to the first microcommand of the loop. Now, each microcommand read-out from the microprogram memory WCM is also input into the buffer memory MC. The loop mode is disconnected by the statement of one of severl possible subsidiary funtions in a microcommand. All entries in the buffer memory MC are thus declared invalid, i.e. in the marker network MCP all of the noting flip-flops are reset. The control sequence again adopts the normal mode of operation.

FIG. 3 illustrates the indicated siezure of the buffer memory MC and the state of the assigned marker network MCP for the example of the microprogram illustrated in FIG. 2. In the buffer memory MC the storage positions of the buffer for, in each case, one microcommand word are referenced MCO–MCy and in the marker network MCP the individual noting flip-flops assigned to these storage positions are referenced MCPO–MCPy. Valid entries in the buffer memory MC are directly indicated by entered microcommands MB1–MB9, whereas invalid entries are symbolized by an asterisk (*).

Figure 5:
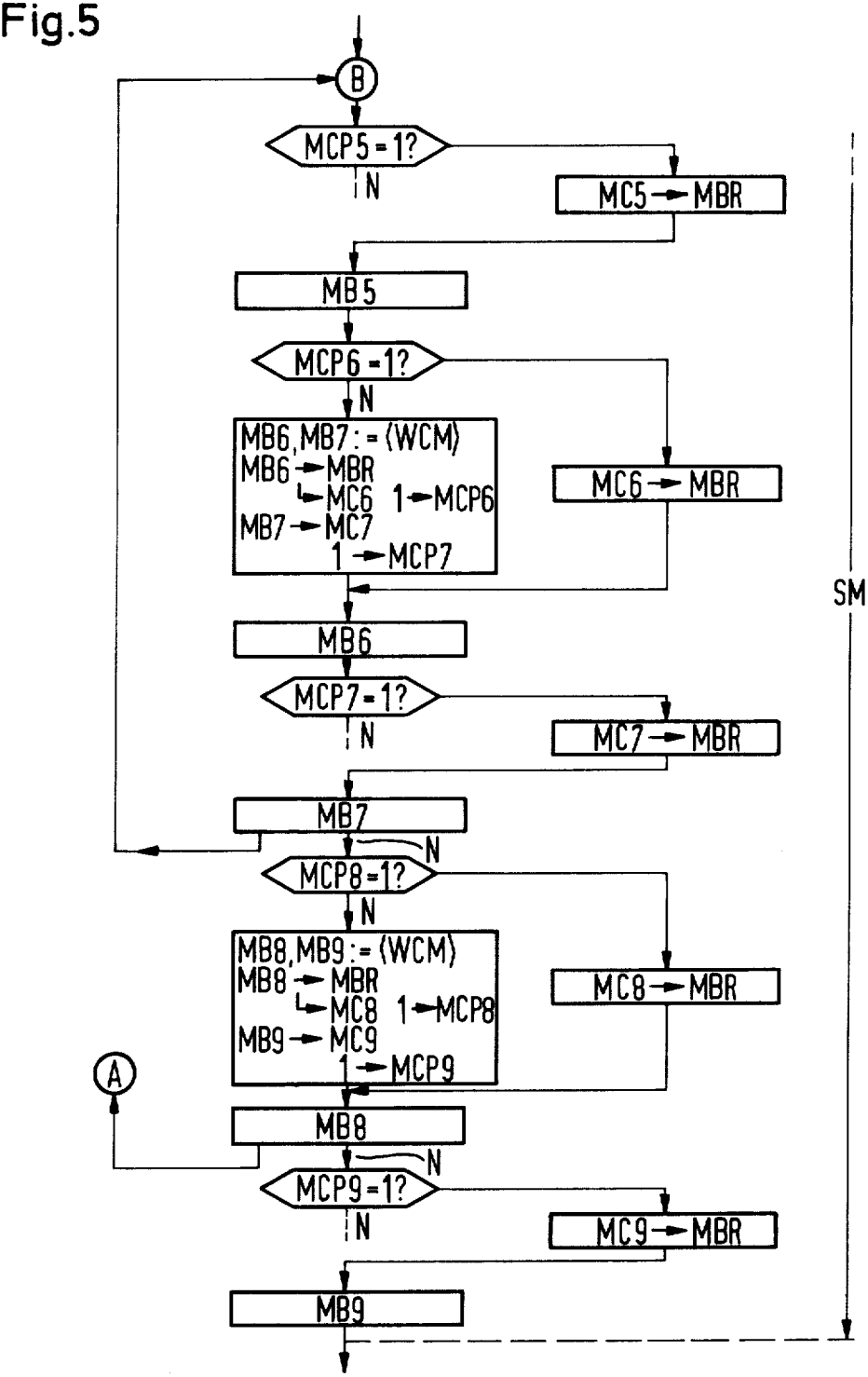

The detailed flow of the microprogram will be explained making reference to a flow chart which is divided between FIGS. 4 and 5. The flow chart shows, beginning at the to part of FIG. 4, that initially, with one memory access, the two microcommands MB0 and MB1 are read-out from the microprogram memory WCM. The first microcommand MB0 is directly transferred into the microcommand register MBR, whereas the second microcommand MB1 is intermediately stored in the buffer memory MC. The storage position MC1 is selected on the basis of the $a + 1$ low-value bit positions of the entry in the address register AR in accordance with equation (2). With this entry, the associated noting flip-flop MCP1 is set in the marker network MCP and thus the entry is made valid.

The first microcommand MB0 is decoded, executed and hereupon, on the basis of the $(a + 1)$ low-value bit positions of the address of the following microcommand, the noting flip-flop MCP1 is interrogated as to whether it characterizes a valid entry. As this is a valid entry, the second microcommand MB1 stored in the storage position MC1 is transferred into the microcommand register MBR and, at the same time, the assigned noting flip-flop MCP1 is reset, as the normal mode is in effect. The second microcommand MB1 which has now been made available can now be decoded and processed. In one of its subsidiary functions it contains a statement to the effect that with the next microcommand the microprogram is entering a loop.

Therefore, the normal mode NM—indicated by the righthand vertical arrows—has ended, and the control adopts the loop mode SM which is represented in similar fashion. First of all, the second noting flip-flop MCP2 is interrogated. The latter is still reset and thus indicates that the two next microcommands MB2 and MB3 must first be read-out from the microprogram memory WCM. The microcommand MB2 is directly transferred into the microcommand register MBR and into the storage position MC2 of the buffer memory MC. The other microcommand MB3 is stored in the storage position MC3 of the buffer memory and both entries are declared valid. Following the processing of the microcommand MB2, it is interrogated whether the next storage position in the buffer memory MC contains a valid entry; and as such is the case, the contents of this storage position is transferred into the microcommand register MBR. The fourth microcommand MB3 is thus available and can be decoded and processed.

Subsequently, the next noting flip-flop MCP4 is interrogated. In the first cycle of the program loop, the flip-flop MCP4 still marks that there is no valid entry and, consequently, the two following microcommands MB4 and MB5 are first read-out from the microprogram memory WCM and are treated in a similar fashion to the microcommands MB2 and MB3.

In the processing of the fifth microcommand MB4 which, as summed, constitutes the last microcommand of the internested program loop S1.1, it is established, for example, whether the test condition for this loop S1.1 is fulfilled. If it is fulfilled, the program loop closes and the program flow recommences at the junction referenced A. In a new cycle of the program loop S1.1, all the required microcommands are already contained in the buffer memory MC. Therefore, all of the microcommands are read-out from the buffer memory MC and are transferred into the microcommand register MBR. This program loop S1.1 can be run through several times until the test condition is no longer fulfilled in the fifth microcommand MB4.

Then, the sixth microcommand MB5 is directly obtained from the storage position MC5 of the buffer memory MC as the assigned noting flip-flop MCP5 is already set. Thus, the program flow has entered the second, internested loop S1.2 which, commencing at the junction B, like the first loop S1.1, is operated until the test condition is no longer fulfilled in the eighth microcommand MB7. Consequently, the following microcommands MB8 and MB9 are made available by being read-out from the microprogram memory WCM. In the execution of the ninth microcommand MB8, the test condition for the superordinate loop S1 is interrogated. If the test is fulfilled, the microprogram recommences at the junction A. If, however, the test condition is not fulfilled in the ninth microcommand MB8, the tenth microcommand MB9 is transferred from the buffer memory MC into the microcommand register MBR. On the execution of the latter, the loop mode Sm is disconnected by a subsidary function, i.e. all the noting flip-flops MCPO–MCPy are reset in the marker network MCP, and thus all of the entries in the buffer memory MC are declared invalid.

The above explained control sequence for a basic microprogram clearly illustrates that the access width to the microprogram memory WCm and the microcommand fomat can, in this case, be selected practically independently of one another. In this case, a large access width to the microprogram memory WCM can even prove advantageous as in this manner following microcommands are already stored intermediately in the buffer memory and can then be written into the microcommand register MBR from the buffer memory MC with a considerably lower access time. This applies both to the normal mode and to the loop mode, although in the case of the normal mode it should be taken into account that entry in the buffer memory MC is declared invalid immediately following the first call-up, whereas in the case of the loop mode it remains valid until the loop mode is disconnected. The circuit expense required for this control sequence, which substantially increases the efficiency of the processor, is, as described, low in relation to the increase in efficiency achieved. It also provides the advantage that the structure of the processor is substantially less dependent upon the selected storage medium of the microprogram memory and thus, as far as the future is concerned, will continue to be able to be used even with the likely development of higher-speed storaage media and, with the use of such storage media, a higher degree of efficiency will be achieved automatically, i.e. without circuitry modifications in the processor, in the entire system.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a microprogrammable data processor having a writable control memory with an access time which is greater than the machine cycle, and a control unit for deriving control signals from microcommands stored in said writable control memory comprising: an address register connected to selection inputs of said writable control memory for addressing the same; a microcommand register connected in parallel for selective operation to the information outputs of said writable control memory and to outputs of a buffer memory having inputs connected to the outputs of said writable control memory and an access time which is considerably less than that of said writable control memory and including a plurality of cells each capable of storing a microcommand, a decoder connected to said register for deriving control signals for the processor from a microcommand in said microcommand register; a switching network connected between said microcommand register and said address register for forming the address of the following microcommand; addressing inputs of said buffer memory connected to said address register and said cells of said buffer memory selected by low-value bits of an entry in said address register; and a marker network connected to said buffer memory, said marker network responsive to the low-value bits of the entry in said address register to mark an entry in a corresponding storage position of said buffer memory so that the next of said microcommands to be operated is selected from said marked cell and loaded into said microcommand register.

2. A method of operating a data processing system in which a microprogrammable processor has a writable control memory with an access time which is greater than the machine cycle, and a control unit for deriving control signals from microcommands stored in said writable control memory comprising an address register connected to selection inputs of said writable control memory for addressing the same, a microcommand register connected in parallel for selective operation to information inputs of the writable control memory and to outputs of a buffer memory which has inputs connected to the outputs of the writable control memory and having an access time which is considerably less than that of the writable control memory, and including a plurality of cells each capable of storing a microcommand, a decoder connected to the register for deriving control signals for the processor, a microcommand in the microcommand register, a switching network connected between the microcommand register and the address register for forming the address of the following microcommand, addressing inputs of the buffer memory connected to the address register and to the cells of the buffer memory selected by low-value bits of an entry in the address register, and a marker network connected to the buffer memory and responsive to the low-value bits of an entry in the address register to mark an entry in a corresponding storage position of the buffer memory such that the next of the microcommands to be operated is selected from the mark cell and loaded into the microcommand register, said method comprising the steps of: addressing more than one microcommand in the writable control memory with one storage access; directly transferring the first of the addressed microcommands from the writable control memory into the microcommand register; decoding the transferred microcommand in the decoder, buffering at least one second microcommand in a storge position of the buffer memory; marking the storage position of the buffer memory by setting a marking flip-flop in the marker network; processing the first microcommand and afterwards transferring the buffered following microcommands one after another from the buffer memory into the microcommand register and resetting the assigned marking flip-flop.

3. A method of operating a data processing system according to claim 2, wherein microcommands form a loop in a microprogram, and processing the same, comprising the steps of marking a following loop in the microprogram by setting a loop function code within a bit group of a microcommand which precedes the loop, the bit group defining subsidiary functions in addition to the main function of a microcommand defined by the condition of its operation code field and operand fields, subsequently, and on the first execution, consecutively transferring all of the microcommands of the program loop from the microprogram memory both into the microcommand register and into consecutive storage positions of the buffer memory, together with each entry in a storage position of the buffer memory, setting corresponding marker flip-flops in the marker network, repetitively addressing the marked storage positions of the buffer memory consecutively in the loop mode and transferring the selected microcommand into the microcommand register for purposes of decoding, and erasing all entries in the buffer memory by resetting the corresponding marking flip-flops in the marker network as soon as a subsidiary function which indicates that the loop has been processed and the loop mode is to be turned off is set in a microcommand following the program loop.

* * * * *